United States Patent [19]

Ashby et al.

[11] Patent Number: 4,878,513
[45] Date of Patent: Nov. 7, 1989

[54] QUICK VENT VALVE FOR AIR BRAKE LINE

[75] Inventors: David P. Ashby, Kirkland; Charles J. Green, Vashon, both of Wash.

[73] Assignee: GT Development Corporation, Tukwila, Wash.

[21] Appl. No.: 250,758

[22] Filed: Sep. 28, 1988

[51] Int. Cl.4 ............................................. B60T 15/30
[52] U.S. Cl. ...................................... 137/102; 303/69
[58] Field of Search .................. 137/102, 107; 303/69

[56] References Cited

U.S. PATENT DOCUMENTS

| 2,716,997 | 9/1955 | Crookston | 137/102 |
| 3,196,890 | 7/1965 | Brandenberg | 137/102 |
| 4,461,313 | 7/1984 | Beaumont | 137/102 |
| 4,596,265 | 6/1986 | Goodell | 137/102 |

FOREIGN PATENT DOCUMENTS

| 1187441 | 9/1960 | Fed. Rep. of Germany | 137/102 |
| 539538 | 6/1922 | France | 303/69 |
| 2075640 | 11/1981 | United Kingdom | 137/106 |

Primary Examiner—Robert G. Nilson
Attorney, Agent, or Firm—Joan H. Pauly

[57] ABSTRACT

A valve has a direct flow passage extending therethrough. A flexible diaphragm (170) is positioned between a main valve seat (156) and an exhaust seat (172). Flow of pressurized air into the valve (110) through the inlet port (142) deflects the diaphragm (170) away from the main seat (156) and seals it against the exhaust seat (172). Higher pressure at the delivery port (144) than the inlet port (142) move the diaphragm (170) away from the exhaust seat (172) and against the main seat (156). A shunt passageway communicates portions of the flow passage on opposite sides of the diaphragm (170) to prevent maintenance of residual positive pressure on the delivery side of the diaphragm (170). The shunt passageway includes a groove (161) along the frustoconical main seat (156) and peripheral cutouts (171) on the diaphragm (170). In one embodiment (210) of the valve, a push member (272, 276) moves against the diaphragm (270) to help unseat it from the exhaust seat (272).

15 Claims, 6 Drawing Sheets

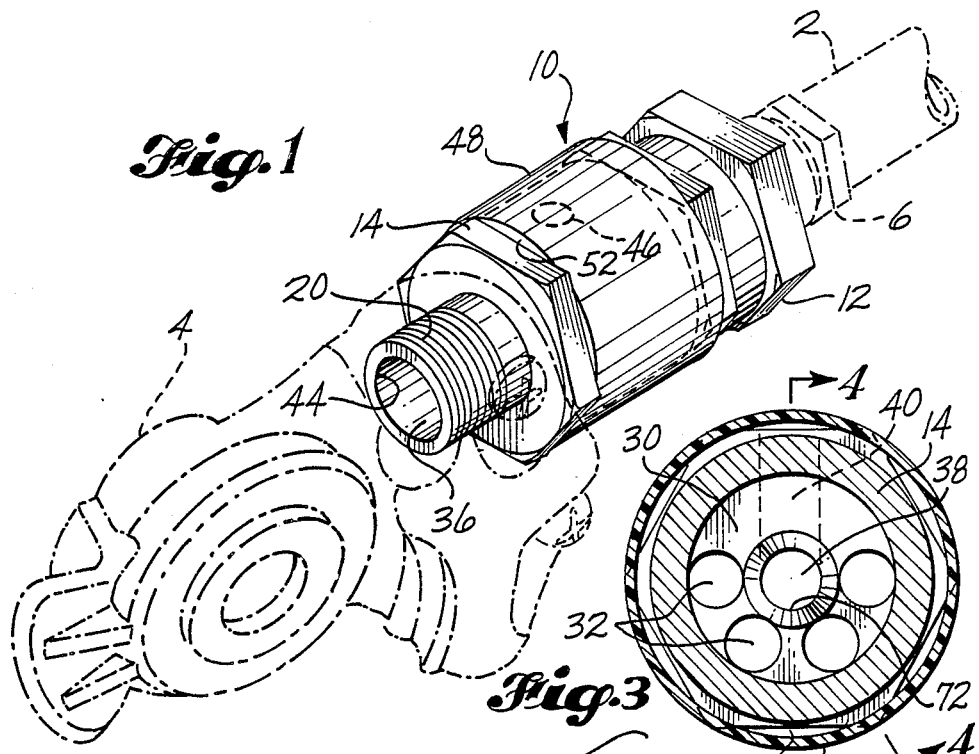
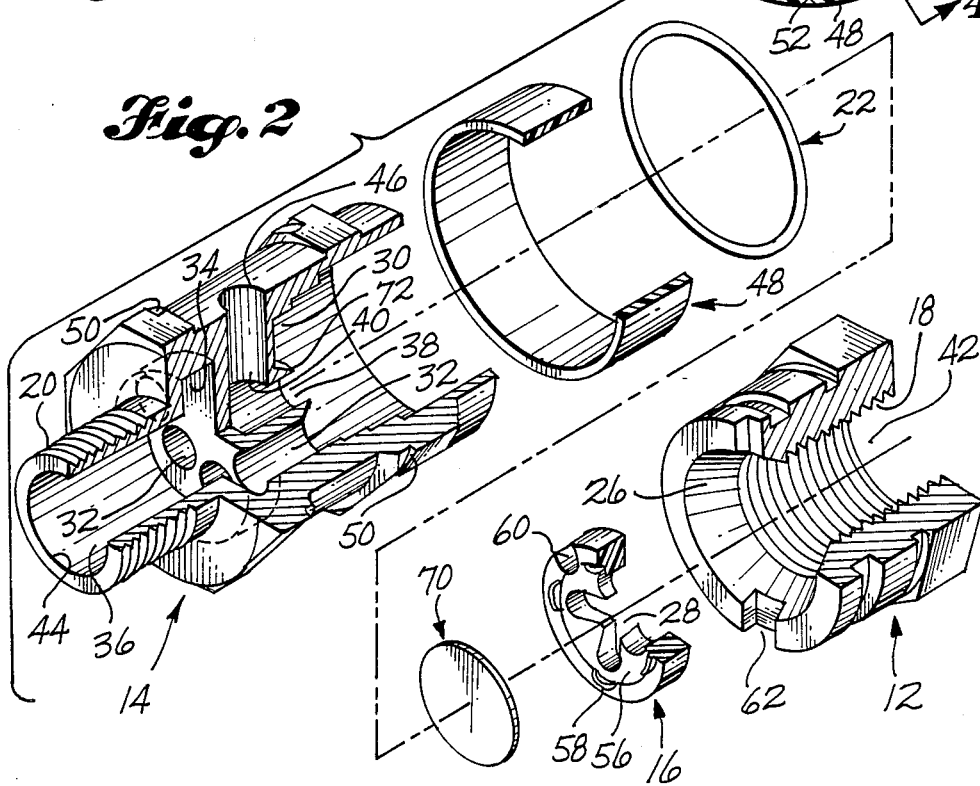

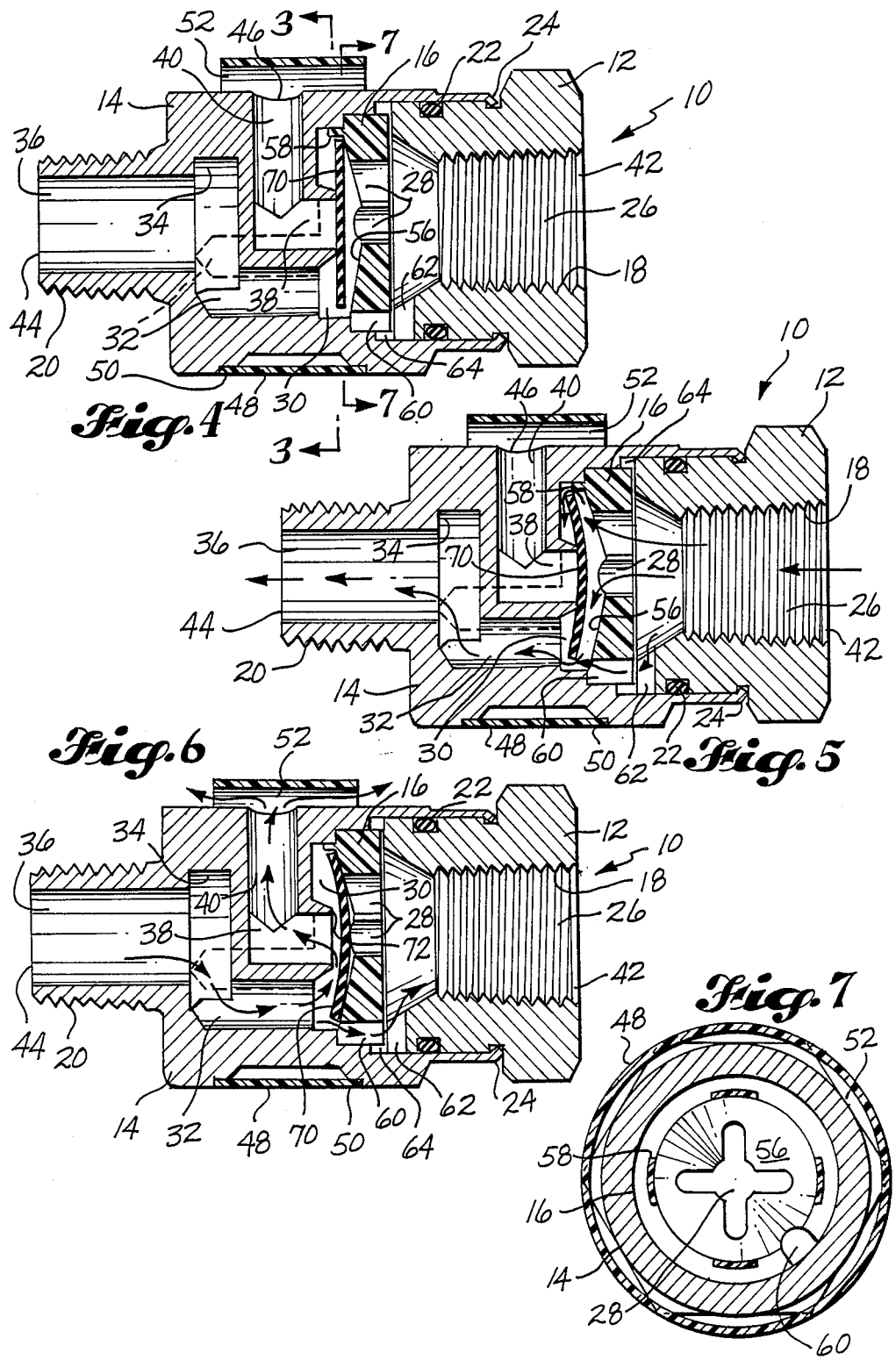

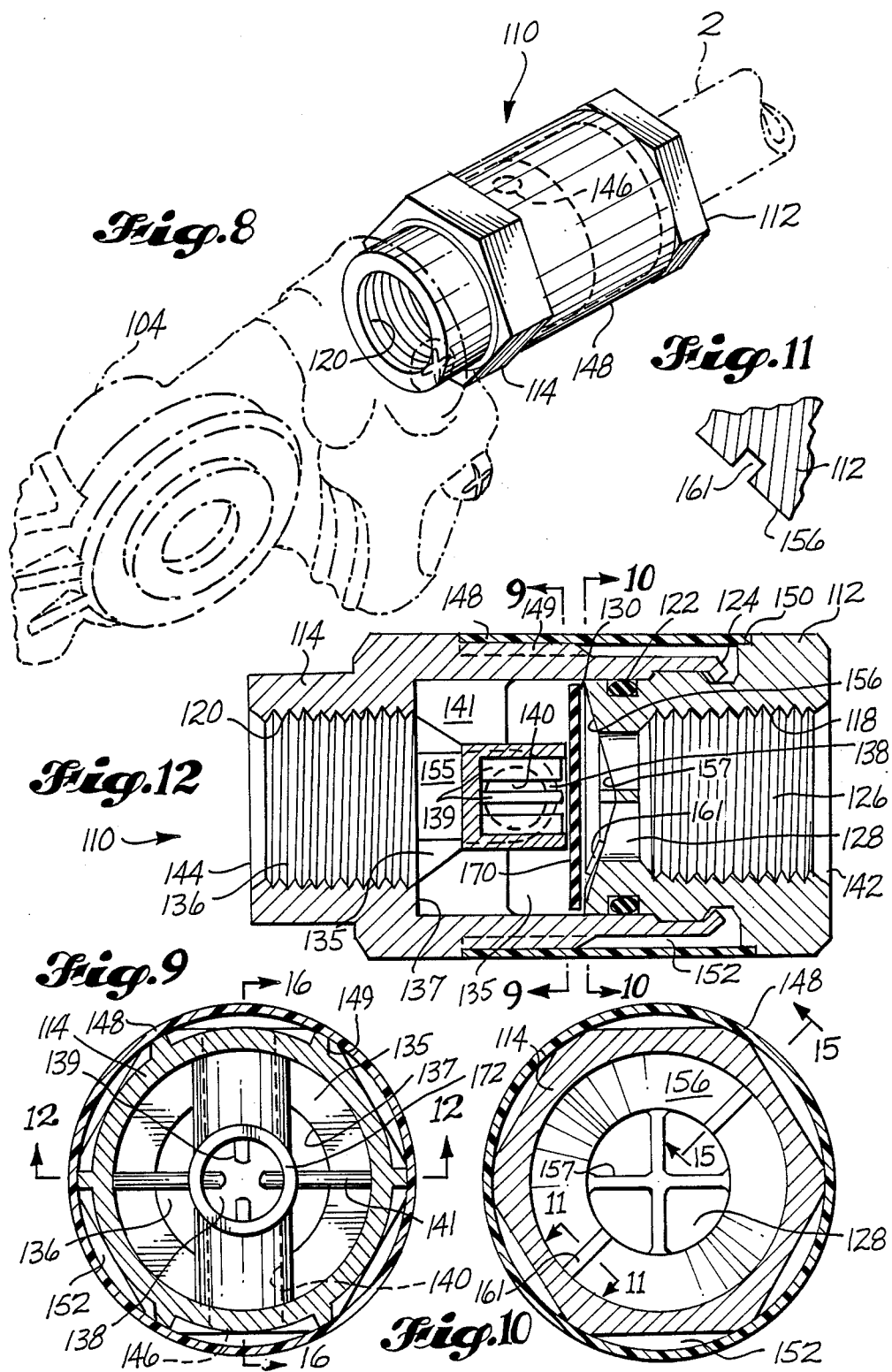

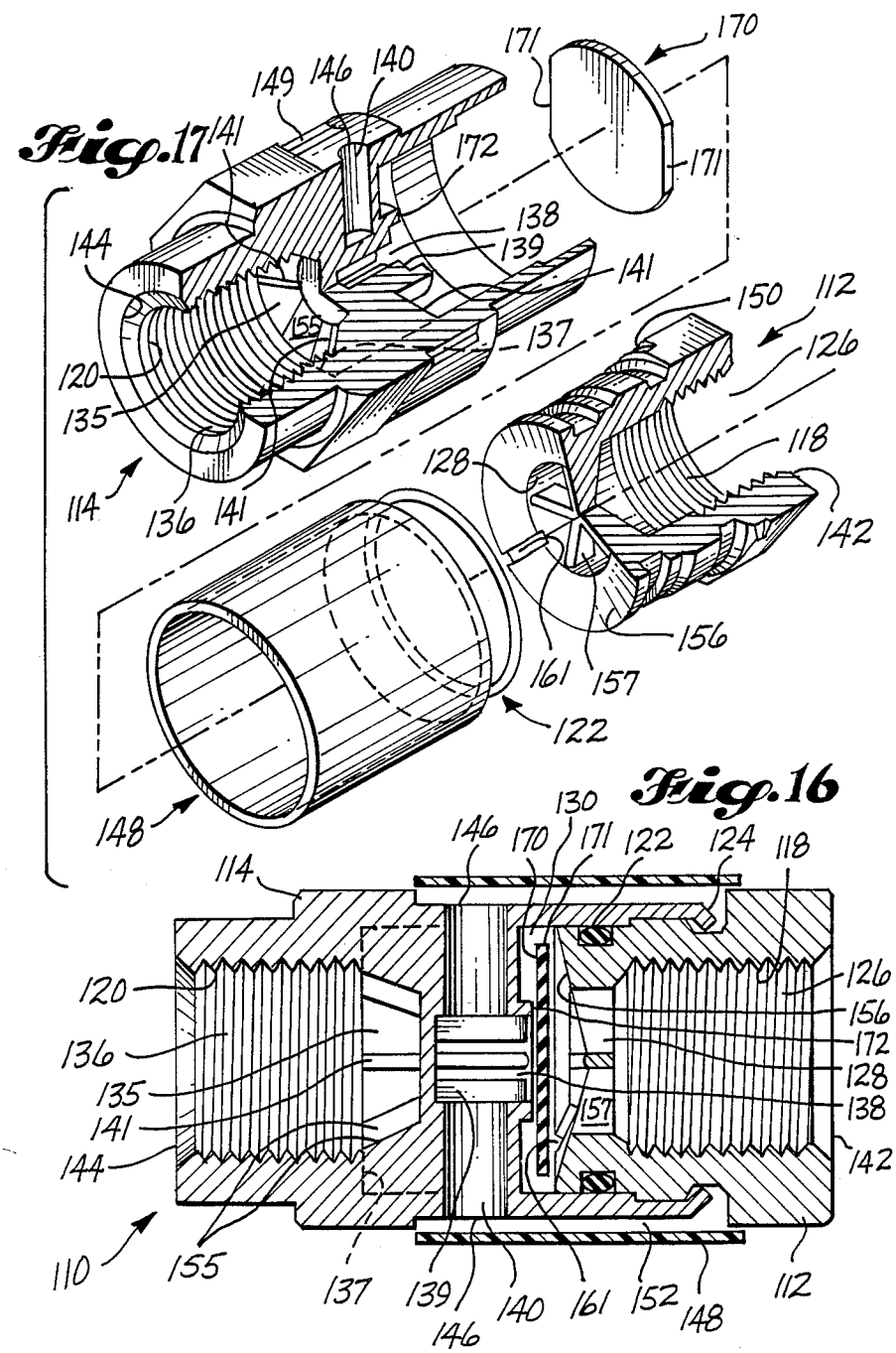

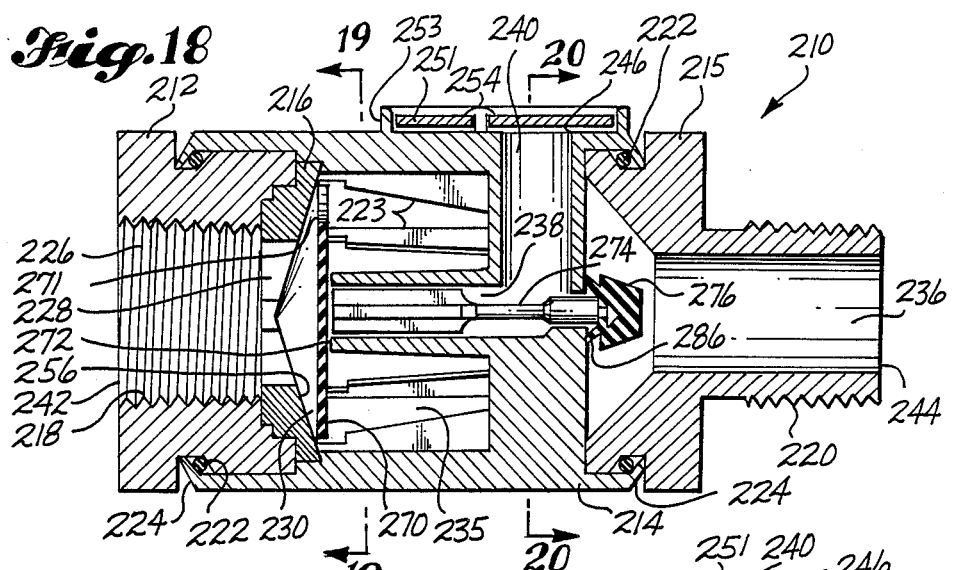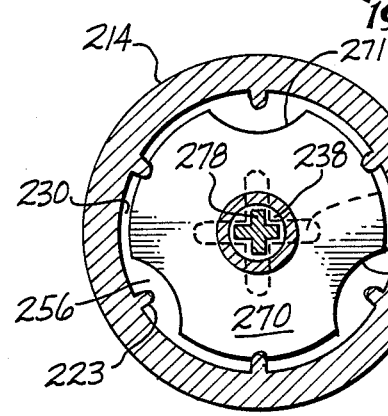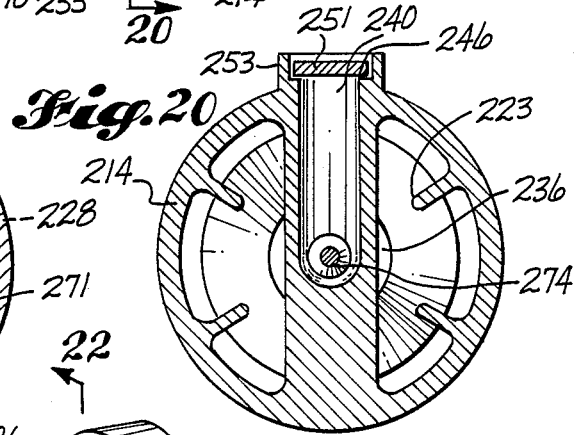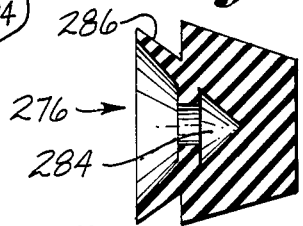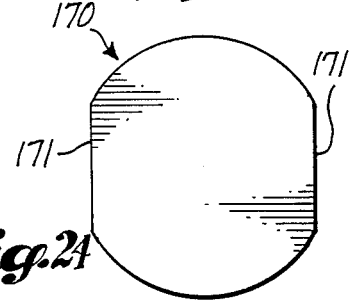

4,878,513

QUICK VENT VALVE FOR AIR BRAKE LINE

TECHICAL FIELD

This invention relates to valves for venting air brake lines and, more particularly, to such a valve having a valve element that responds substantially instantaneously to supply pressure to seal an exhaust passage, and a shunt passageway to prevent maintenance of residual pressure at the delivery end of the valve due to incomplete exhausting of the line.

BACKGROUND ART

In trucks of the type having a tractor portion and a trailer portion, the trailer portion is normally provided with air brakes. The pedal for applying the trailer brakes and releasing them is conventionally located in the cab of the tractor portion. Upon release of the brake pedal, the supply or tractor portion of the brake line is exhausted through a valve located under the cab. It is known to provide a valve in the air brake line between the pedal and the trailer brakes to vent the trailer portion of the line upon release of the brake pedal. This helps eliminate or reduce lag time between release of the brake pedal and release of the trailer brakes. A known type of vent valve has opposite coaxial inlet and exhaust ports and a perpendicular delivery port. A flexible diaphragm is positioned between the inlet and exhaust ports. The diaphragm deflects to close communication with the exhaust port when the brakes are applied and to close communication with the inlet port when the brakes are released. In each case, the diaphragm seals against a valve seat to seal off all communication with the respective port.

A problem that has arisen in connection with this known type of valve is that the diaphragm tends to reseal against the exhaust seat before the trailer end of the brake line is completely exhausted. This creates a residual positive pressure in the trailer end of the brake line and a residual pressure differential across the diaphragm. The residual positive pressure in the trailer brake line can result in dragging of the trailer brakes and consequent excessive wear of the trailer brakes. The dragging of the brakes also leads to excessive wear of the trailer tires. Another problem associated with the conventional type of valve is that the inlet and delivery ports are not coaxial. Therefore, the valve is not line mountable and does not provide a direct flow pathway between the tractor and trailer portions of the brake line.

Valves of the type described above are disclosed in K. A. Brandenberg U.S. Pat. No. 3,196,890, granted Jul. 27, 1965; P. Beaumont U.S. Pat. No. 4,461,313, granted Jul. 24, 1984; D. J. Goodell U.S. Pat. No. 4,596,265 granted Jun. 24, 1986. J. Goodell. The Beaumont and Goodell valves are specifically described as being for vehicle braking systems. The Beaumont valve is designed to minimize or eliminate the hiss which accompanies the exhausting of "conventional" valves. The diaphragm in the Beaumont valve has a central working area and a peripheral support area. Indents or cutouts are formed in the peripheral area to minimize noise produced by vibration of the diaphragm during exhausting of the delivery portion of the line.

R. R. Crookston U.S. Pat. No. 2,716,997, granted Sept. 6, 1955, discloses a quick release valve for pressurized air supply lines connected to devices such as pumps and engine clutches of industrial engines. The valve has coaxial inlet and delivery ports and is coaxial with the supply line. It is designed to supply air pressure at a controlled rate and allow rapid release of pressure. A sliding valve member has a delivery position in which it seals a radially directed exhaust port. When a remote valve is operated to cut off the supply of pressurized air and bleed the supply line, a pressure differential is created and moves the valve member to an exhaust position. In one of the embodiments disclosed by Crookston, the valve inlet port is not completely sealed from the delivery port when the valve member is in the exhaust position. A slidable element within the valve member has a small central axial orifice that allows a small amount of flow past the valve element. The described purpose for this arrangement is that the valve position is not changed if an operator opens or closes the remote valve and quickly changes his mind. In other words, it creates an intentional lag in the response of the valve element in moving to either its delivery position or its exhaust position.

The above-cited patents and the prior art that is discussed and/or cited therein should be studied for the purpose of putting the present invention into proper perspective relative to the prior art.

DISCLOSURE OF THE INVENTION

The subject of the invention is a vent valve for an air brake line having a supply end and a delivery end. According to an aspect of the invention, the valve comprises a valve housing, a valve element, and a shunt passageway. The housing has means for attaching the housing to the brake line intermediate said ends. The housing defines a flow passage extending therethrough, an exhaust passage communicating the flow passage with the exterior of the housing, an inlet port positioned to communicate the flow passage with the supply end of the line, and a delivery port positioned to communicate the flow passage with the delivery end of the line. The valve element has a supply position in which it closes the exhaust passage and allows flow through the flow passage from the supply end of the line to the delivery end of the line when there is higher pressure at the inlet port than at the delivery port. The valve element also has an exhaust position in which it substantially closes the flow passage and allows flow from the delivery end of the line through the delivery port and out of the housing through the exhaust passage when there is higher pressure at the delivery port than at the inlet port. The valve element is adapted to respond substantially instantaneously to greater pressure at the inlet port than the delivery port by moving into its supply position. The shunt passageway communicates two portions of the flow passage on opposite sides of the valve element to prevent maintenance of a higher pressure at the delivery port than the inlet port due to movement of the valve element away from its exhaust position before pressures at the delivery port and the inlet port are equalized.

A feature of the invention is a valve element that comprises a diaphragm that has opposite faces and deflects when these faces are exposed to different pressures. The diaphragm has sufficient flexibility to substantially instantaneously deflect to allow flow through the flow passage when the pressure at the inlet port rises above the pressure at the delivery port. This feature has the advantages of helping to maximize the simplicity and economy of structure of the valve and of readily providing the desired substantially instantaneous sealing of the exhaust passage and opening of the flow passage in response to supply pressure.

Another feature of the invention is an exhaust passage that has an inner end surrounded by a valve seat which is substantially coaxial with the flow passage, and an outer end spaced radially from the flow passage. The flow passage extends around and past the valve seat and is coaxial with the inlet port and the delivery port. This feature has the advantage of providing a direct flow passage through the valve so that the valve can be mounted coaxially with the brake line. This increases the ease of mounting the valve and helps minimize the space required by the connections of the valve to the line. It also provides a direct continuous flow pathway for the pressurized air to help maximize the overall efficiency of the brake line arrangement.

The shunt passageway may take various forms. According to an aspect of the invention, a valve seat surrounds the flow passage between the inlet port and the delivery port. The valve element engages the seat to substantially close the flow passage in its exhaust position. The shunt passageway comprises a peripheral axial opening through the valve element adjacent to the seat to prevent a complete seal between the seat and the valve element. Alternatively, the shunt passageway may comprise a bypass passage that is formed by the housing and that extends around the periphery of and/or through the seat. The shunt passageway may also include both an axial opening through the valve element and a bypass passage formed by the housing.

In the most preferred embodiment, the valve element comprises a flexible diaphragm, and the shunt passageway includes both an axial opening through the diaphragm and a bypass passage formed by the housing. This arrangement has all the advantages of the flexible diaphragm and helps maximize the efficiency and reliability of the shunt passageway. When the brake pedal is released very slowly, the axial opening through the diaphragm provides a relatively large bypass opening prior to actuation of the valve to move the diaphragm into its exhaust position. If the brake pedal is released rapidly, the diaphragm opening provides quick exhaust. However, the diaphragm opening approach has the disadvantage that, if it is the only bypass opening, a pressure differential might still be maintained on a quick release of the brake pedal if the diaphragm is sufficiently flexible to seal against the valve seat. The approach of providing a bypass passage formed by the housing has the advantage of providing a more constant bypass to ensure complete dissipation of the pressure differential regardless of how slowly or rapidly the brake pedal is released.

A preferred feature is a valve seat that surrounds the flow passage and includes a frustoconical surface having a center axial opening that forms part of the flow passage. The bypass passage extends along the frustoconical surface from the center axial opening to and through the outer periphery of the valve seat. This arrangement has the advantage of being relatively simple and inexpensive to manufacture. It also is well adapted to the use of a flexible diaphragm as a valve element.

Another feature of the invention is a slidable push member. The exhaust passage has an inner end surrounded by a valve seat against which the diaphragm seals in its supply position. The push member has a first end positioned in the exhaust passage adjacent to the valve seat. The second end of the push member is exposed to pressure in the flow passage at a location between the diaphragm and the delivery port to move the first end of the push member against the diaphragm to help unseat the diaphragm in response to pressure at said location higher than pressure at the inlet port. Preferably, the second end of the push member comprises a head with a flexible frustoconical flange. The flange seals against an outer wall of the exhaust passage and deflects to allow the first end of the push member to move against the diaphragm.

The valve of the invention solves the problem of residual positive pressure in the trailer end of the brake line which is encountered in connection with the use of conventional vent valves. The shunt passageway provides a means for dissipating any positive pressure on the trailer end of the brake line following movement of the valve element away from its exhaust position before pressures at the delivery port and inlet port are equalized. The dissipation of the positive pressure is accomplished without sacrificing the quick responsiveness of the valve which is necessary for maximum safety. The valve element responds substantially instantaneously to supply pressure to allow the brakes to be applied quickly in an emergency, but the shunt passageway prevents the responsiveness of the valve element from creating the problem of residual positive pressure. The solving of the problem of residual pressure in turn avoids excessive tire and brake wear. Therefore, the valve of the invention increases the overall efficiency of the brake system and of the vehicle. In addition, the basic design of the valve of the invention readily accommodates the preferred feature of coaxial inlet and delivery ports, which has the advantages discussed above.

These and other advantages and features will become apparent from the detailed description of the best modes for carrying out the invention that follows.

BRIEF DESCRIPTION OF THE DRAWINGS

In the drawings, like element designations refer to like parts throughout and:

FIG. 1 is a pictorial view of a first preferred embodiment of the valve, with the gladhand connector and brake line to which it is attached shown in broken lines.

FIG. 2 is an exploded pictorial view of the valve shown in FIG. 1.

FIG. 3 is a sectional view taken substantially along the line 3—3 in FIG. 4.

FIG. 4 is a sectional view taken along the line 4—4 in FIG. 3, showing the valve in its rest position when pressures on the opposite sides of the diaphragm are equal.

FIG. 5 is like FIG. 4 except that it shows the valve in its supply position.

FIG. 6 is like FIGS. 4 and 5 except that it shows the valve in its exhaust position.

FIG. 7 is a sectional view taken substantially along the line 7—7 in FIG. 4.

FIG. 8 is a view like FIG. 1 except that it shows the second most preferred embodiment of the valve.

FIG. 9 is a sectional view taken along the line 9—9 in FIG. 12.

FIG. 10 is a sectional view taken along the line 10—10 in FIG. 12.

FIG. 11 is a sectional view taken along the line 11—11 in FIG. 10.

FIG. 12 is a sectional view taken substantially along the line 12—12 in FIG. 9, showing the valve in its rest position.

FIG. 16 is a sectional view taken substantially along the line 16—16 in FIG. 9.

FIG. 17 is an exploded pictorial view of the valve shown in FIGS. 8-16.

FIG. 18 is a sectional view similar to FIGS. 4 and 16 except that it shows a third embodiment of the valve with parts shown in elevation.

FIG. 19 is a sectional view taken along the line 19—19 in FIG. 18.

FIG. 20 is a sectional view taken along the line 20—20 in FIG. 18.

FIG. 21 is an exploded pictorial view of the push member shown in FIGS. 18-20.

FIG. 22 is an enlarged sectional view taken along the line 22—22 in FIG. 21, showing the head portion of the push member.

FIG. 23 is an elevational view of an alternative form of the diaphragm.

FIG. 24 is similar to FIG. 23 except that it shows the diaphragm of the embodiment shown in FIGS. 8-17.

BEST MODES FOR CARRYING OUT THE INVENTION

Figure 13:
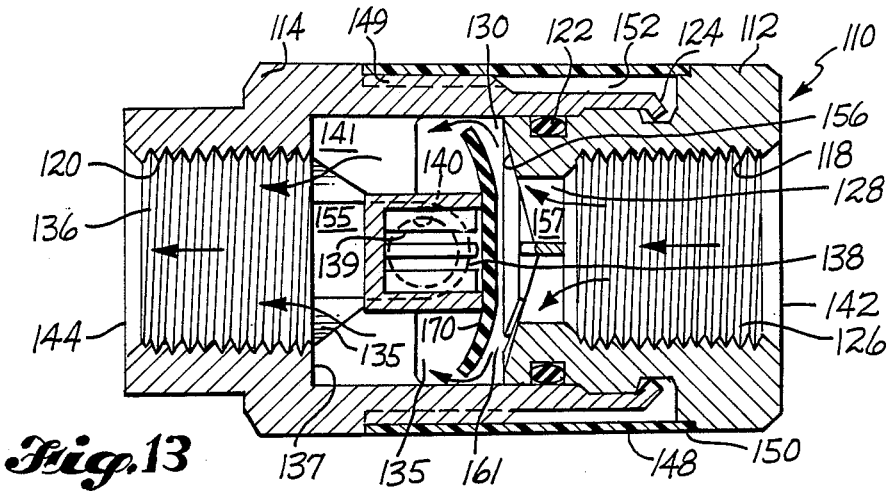
FIG. 13 is like FIG. 12 except that it shows the valve in its supply position.
Figure 14:
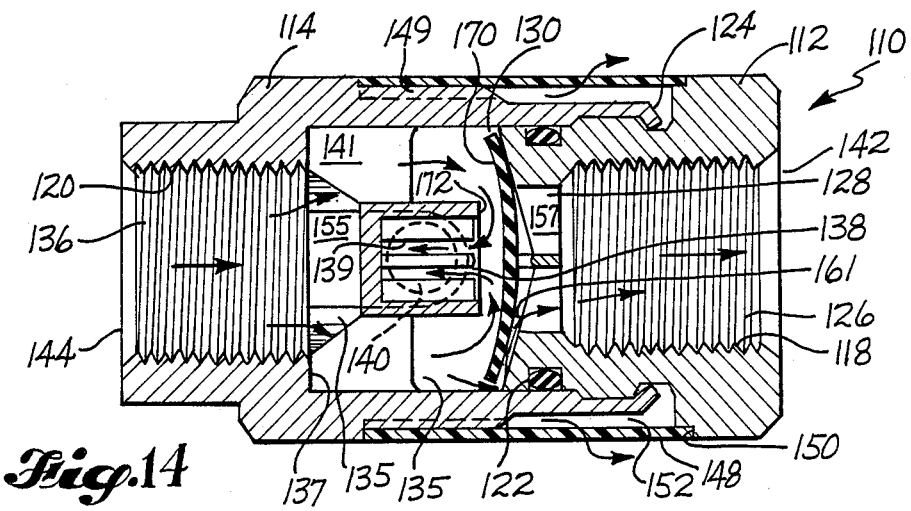
FIG. 14 is like FIGS. 12 and 13 except that it shows the valve in its exhaust position.

The drawings show three valves 10,110,210 that are constructed according to the invention and that also constitute the best modes of the invention currently known to the applicants. The valves 10,110 are shown in FIGS. 1 and 8 connected to the tractor side of a conventional gladhand connector 4,104 which is provided at the junction between the tractor and trailer ends of the tractor air brake line 2. This positioning of the valve is preferred since it only requires one vent valve. Therefore, it is anticipated that the valve of the invention will be used primarily in the position shown in FIGS. 1 and 8. However, it is of course to be understood that the valve of the invention may also be incorporated to advantage at other points in the brake line and in association with other types of connectors.

Referring to FIG. 1, the inlet end 12 of the first preferred embodiment of the valve 10 is connected to the tractor portion of the line 2 by means of a connector 6. The delivery end 14 of the valve 10 is connected to the tractor side of the gladhand connector 4. The valve 10 comprises a housing 12,14,16. The housing includes an inlet portion 12, a delivery portion 14, and a plastic insert 16 positioned between the inlet and delivery portions 12,14. The inlet and delivery portions 12,14 are provided with threads 18,20 for attaching the housing 12,14,16 to the line 2 through the connectors 4,6. An O-ring 22 is positioned radially between the inlet and delivery portions 12,14 to seal the connection therebetween. The end of the delivery portion 14 opposite the threaded end is crimped, as at 24, to secure the two housing portions 12,14 together.

Referring to FIGS. 3-7, in the assembled valve 10, the housing portions 12,14,16 form a direct flow passage 26,28,30,32,34,36 through the valve 10. The delivery portion 14 of the housing also forms an exhaust passage 38,40 having an axial portion 38 and a radial portion 40.

The outer ends of the inlet and delivery portions 12,14 of the housing form inlet and delivery ports 42,44, respectively. These ports 42,44 are coaxial with the flow passage and with the brake line 2. An exhaust port 46 is formed at the outer end of the radial portion 40 of the exhaust passage 38,40. The exhaust port 46 is spaced radially from the flow passage and is oriented perpendicularly to the inlet and delivery ports 42,44.

The flow passage extends into the valve 10 from the inlet port 42 through an axial passage 26 defined by the inlet portion 12 of the housing. The flow passage extends from the passage 26 through a central axial opening 28 in the insert 16 and from the opening 28 into the delivery portion 14 of the housing. In housing portion 14, the flow passage includes a short wide portion 30 adjacent to the insert 16. A valve element in the form of a diaphragm 70 is positioned in the passage portion 30 and seats on the insert 16, as described below. Four parallel axial passages 32 extend downstream from the portion 30 past the exhaust passage 38,40. The axial passages 32 terminate at a second wide portion 34 which communicates the passages 32 with an axial passage 36. The passage 36 extends through the threaded nipple formed on the downstream end of the delivery portion 14 and terminates at the delivery port 44.

The valve 10 has a main valve seat 56 and an exhaust seat 72. The normally flat flexible diaphragm 70 is positioned between the seats 56,72. The diaphragm 70 deflects into a curved configuration to seat against the main seat 56 and the exhaust seat 72, as described below.

The insert 16 is positioned axially between the downstream radial end surface of the inlet housing portion 12 and an internal shoulder formed by the delivery housing portion 14. The outer circumferential surface of the circular insert 16 abuts an inner circumferential surface of the housing portion 14. The downstream surface of the insert 16 forms the frustoconical main valve seat 56. The opening 28, which forms part of the flow passage, extends through the frustoconical surface 56. As shown in FIG. 7, the opening 28 has an X-shaped configuration with a circular radially inner portion. Four circumferentially spaced feet 58 extend axially from the periphery of the frustoconical seat 56. These feet 58 position the circular diaphragm 70 radially with respect to the seat 56, as shown in FIGS. 4-6.

As described above the exhaust passage 38,40 comprises an axial portion 38 and a radial protion 40. The radial portion 40 extends radially inwardly from the exhaust port 46 on the outer circumferential surface of the delivery housing portion 14 into the main flow passage through the valve 10. The axial portion 38 is perpendicular to the radial portion 40 and is coaxial with the flow passage and the inlet and delivery ports 42,44. The inner end of the exhaust passage 38,40 is surrounded by the exhaust seat 72, which is coaxial with the axial portion 38, the main valve seat 56, and the opening 28 therethrough. The exhaust seat 72 is surrounded by the wide portion 30 of the flow passage. The flow passage extends through the axial passages 32 past the exhaust passage 38,40 to the wide portion 34 of the flow passage, which is located on the downstream side of the exhaust passage 38,40.

The exhaust port 46 is protected by an annular dirt sleeve 48. The port 46 opens onto a cylindrical portion of the outer surface of the housing portion 14 between two projecting hexagonal portions. The hexagonal portions are provided with flats or cutouts 50 on each of their points adjacent to the cylindrical surface for receiving and retaining the sleeve 48. As can be seen in FIGS. 1 and 3–7, the positioning of the sleeve 48 on the cutouts 50 spaces the sleeve 48 radially outwardly from the cylindrical surface of the housing portion 14 and from the flat portions of the hexagonal outer surfaces. The radial space 52 allows free unobstructed flow of exhaust air from the valve 10 while the dirt sleeve 48 protects the valve 10 against dirt and other contaminants entering the exhaust port 46.

The exhaust seat 72 is smaller in diameter than the main seat 56. The diaphragm 70 completely seals the exhaust passage 38,40 when it seats against the exhaust seat 72 in its supply position shown in FIG. 5 and described below. When the diaphragm 70 is in its exhaust position, shown in FIG. 6, it substantially closes but does not completely seal the flow passage. The complete sealing of the flow passage is prevented by a shunt passageway which is an essential feature of the invention. The shunt passageway maintains communication between the axial passage 26 through the housing portion 12 and the wide flow passage portion 30 in the housing portion 14 regardless of the position of the diaphragm 70. The shunt passageway comprises two diametrically opposite radial grooves 62 extending along the downstream radial end face of the housing portion 12 from the axial passage 26 to the outer circumferential surface of the housing portion 12. An annular space 64 between the inner circumferential surface of the housing portion 14 and the outer circumferential surface of the insert 16 communicates the grooves 62 with an axial groove or bypass passage 60 that extends along the outer circumferential surface of the insert 16. The passage 60 extends axially around and radially into the outer periphery of the seat 56. The shunt passageway also includes the upstream part of the wide portion 30 of the flow passage around the diaphragm 70.

The operation of the valve 10 is illustrated in FIGS. 4–6. FIG. 4 shows the rest position of the valve in which the pressures on the opposite sides of the diaphragm 70 are equal and the diaphragm 70 is in its normal flat configuration. In this position, the diaphragm 70 is usually lightly loaded against the exhaust seat 72, but it is not necessary for the diaphragm 70 to be seated on the exhaust seat 72 in its rest position when the brake line 2 is not pressurized.

When the operator of the vehicle applies the brakes, pressurized air from a source located in the tractor portion of the vehicle enters the tractor side of the brake line 2 in a known manner and flows downstream toward the trailer portion of the brake line 2. This flow of pressurized air creates a pressure differential across the diaphragm 70 and moves the diaphragm 70 into its supply position shown in FIG. 5. The diaphragm 70 is firmly seated against the exhaust seat 72 to seal off the exhaust passage 38,40. The periphery of the diaphragm 70 deflects, as shown in FIG. 5, to allow free flow around the diaphragm 70 into the delivery portion 14 of the valve housing. The diaphragm 70 is designed to respond substantially instantaneously to the supply flow by sealing the exhaust passage 38,40 and opening the flow passage.

The pressurized air flows freely through the flow passage 26,28,30,32,34,36 from the inlet port 42 to the delivery port 44. A small amount of air also flows downstream through the shunt passageway. This air flows from the axial passage 26 through the radial grooves 62, around the annular space 64 between the outer circumferential surface of the insert 16 and the inner circumferential surface of the housing portion 14, through the circumferential groove 60 on the insert 16, and into the flow passage portion 30 where it joins the main flow around the diaphragm 70. When pressure has equalized on the two sides of the diaphragm 70, the diaphragm 70 returns to its rest configuration shown in FIG. 4 but remains seated against the exhaust seat 72.

When the operator releases the brake pedal, the tractor portion of the brake line 2 upstream of the valve 10 is exhausted through a valve associated with the brake pedal and located under the tractor cab. This creates a pressure differential across the diaphragm 70, with the pressure on the downstream side being higher than the pressure on the upstream side. The pressure differential moves the diaphragm 70 into the exhaust position shown in FIG. 6. The diaphragm 70 deflects into a curved configuration, unseats from the exhaust seat 72, and seats against the main frustoconical seat 56. The unseating of the diaphragm 70 from the exhaust seat 72 allows flow from the trailer or delivery end of the brake line to exhaust to atmosphere through the exhaust passage 38,40, the exhaust port 46, and the radial space 52. The exhaust flow enters the valve 10 through delivery port 44 and flows through flow passage portions 36,34,32,30 into the exhaust passage 38,40. A relatively small amount of flow also occurs from flow passage portion 30 through shunt passageway portions 60,64,62 into the axial passage 26, through inlet port 42 into the tractor end of the brake line 2.

Because of the high degree of responsiveness of the diaphragm 70 to pressure on its supply or upstream side, the diaphragm 70 has a tendency to move away from its exhaust position shown in FIG. 6 and reseat on the exhaust seat 72 before the pressures on the opposite sides of the diaphragm 70 are completely equalized. In the absence of the shunt passageway, this seating of the diaphragm 70 would tend to cause the maintenance of a residual pressure differential across the diaphragm 70, with pressure being higher at the delivery port 44 than the inlet port 42. However, in the valve of the invention, the remaining positive pressure in the trailer portion of the brake line is dissipated, following the sealing of the exhaust passage 38,40, by continued flow through the shunt passageway 30,60,64,62. Since the shunt passageway is always open, the exhaust flow therethrough continues until the positive pressure is fully dissipated and the pressures on the opposite sides of the diaphragm 70 are fully equalized.

In the embodiment of the valve 10 shown in FIGS. 1–7, the valve housing portions 12,14 are preferably made from machined aluminum, and the plastic insert 16 is formed separately to make it possible to carry out the necessary machining without undue difficulty or expense. The most preferred embodiment of the valve 110 is shown in FIGS. 8–17. In this embodiment, the housing portions 112,114 are made from die cast zinc alloy. Instead of being formed on a separate insert, the main valve seat 156 is cast as an integral part of the inlet portion 112 of the housing 112,114. As in the first embodiment 10, the inlet and delivery portions 112,114 of the valve housing are provided with threads 118,120 for attaching the valve 110 to the brake line 2 at the gladhand connector 104, as shown in FIG. 8. An O-ring 122 and crimping 124 seal and maintain the two housing portions 112,114 together, as described above in connection with the embodiment shown in FIGS. 1–7.

The main valve seat 156 is formed by the frustoconical downstream end surface of the inlet housing portion 112. The radial center of the surface 156 forms a cross-shaped web 157 best seen in FIGS. 10 and 17. The open portions of the web 157 provide an axial opening 128 through the seat 156. The web 157 serves as support for the diaphragm 170 and limits its deflection under high surges of back flow.

As in the first embodiment, in the embodiment shown in FIGS. 8-17, a flow passage 126,128,130,135,136 extends directly through the valve 110 from an inlet port 142 to a delivery port 144. The flow passage and ports 142,144 are coaxial with the brake line 2. The flow passage includes a cylindrical portion 126 extending from the inlet port 142 to the web 157, the opening 128 through the web 157 and the main seat 156, a short wide portion 130 which is adjacent to the seat 156 and in which the diaphragm 170 is positioned, parallel passages 135 that extend past the exhaust passage 138,140, and a cylindrical portion 136 that extends through the threaded delivery end of the housing portion 114 to the delivery port 144.

The exhaust passage 138,140 has an axial portion 138 that is coaxial with the flow passage and inlet and delivery ports 142,144 and is surrounded by the passages 135. The exhaust passage 138,140 also includes two radial portions 140 that extend in diametrically opposite directions from the axial portion 138 and terminate in opposite exhaust ports 146. Four circumferentially spaced fins 139 extend radially inwardly into the axial portion 138. The fins 139 prevent the diaphragm 170 from protruding into the passage 138.

Two opposite webs 141 extend perpendicularly to the radial portions 140 between the axial portion 138 and the inner circumferential wall of the housing portion 114. The radial portions 140 and webs 141 separate the parallel flow passages 135, as shown in FIG. 9. The webs 141 extend axially in a downstream direction from the axial exhaust passage portion 138 to a shoulder 137 formed by the housing portion 114 where it narrows to the outer axial passage 136. The walls of the radial exhaust passage portions 140 also extend axially to the shoulder 137. The webs 141 and extensions 155 of the radial exhaust passage walls are angled radially outwardly from the axial exhaust passage portion 138 to the shoulder 137. They space the center axial portion 138 of the exhaust passage 138,140 axially from the shoulder 137 and outer passage 136 and facilitate free flow through the flow passageway around the exhaust passage 138,140. The angling of the fins 141 can be seen in FIGS. 12-14 and 17. The angled outer wall surfaces 155 of the radial passages 140 can be seen in FIGS. 12-14, 16, and 17. Their angled orientation is best shown in FIGS. 16 and 17.

The valve 110 shown in FIGS. 8-17, like the valve 10 shown in FIGS. 1-7, has a dirt sleeve 148 to protect the valve 110 from contamination. In the embodiment of FIGS. 8-17, the sleeve 148 is positioned in a radially spaced relationship from the outer circumferential surface of the housing portion 114 by a plurality of ribs 149 and by flats 150 on the hexagonal outer surface of the housing portion 112 similar to the flats 50 on the valve 10. A rib 149 extends axially along the cylindrical portion of the outer surface of housing portion 114 from each of the points of the hexagonal portion. The ribs 149 and flats 150 provide a radial space 152 to allow free egress of exhaust air, as described above.

In the die cast embodiment of FIGS. 8-17, the shunt passageway includes a bypass passage or groove 161 which extends along the frustoconical seat 156 from the center axial opening 128 to the outer periphery of the housing portion 112. The groove 161 is best seen in FIGS. 10, 11, 15, and 17. The groove 161 communicates the flow passage portion 128 with the annular space 130 around the diaphragm 170 to provide the desired bypass flow. The positioning of the groove 161 along the frustoconical surface 156 is preferred in this embodiment because of its simplicity and ease of manufacture in the die cast process.

As discussed above, the shunt passageway in the valve of the invention preferably includes an axial opening through the diaphragm 170 as well as a bypass passage formed by the housing and extending through the seat. Therefore, in the most preferred embodiment shown in FIGS. 8-17, in addition to the groove or bypass passage 161 formed by the housing portion 112 and extending through the frustoconical seat 156, the shunt passageway includes cutouts 171 formed on diametrically opposite peripheral portions of the generally circular diaphragm 170. The flattened edges of the diaphragm 170 created by the cutouts 171 can be seen in FIGS. 16 and 17. The cutouts 171 are positioned adjacent to the seat 156 to prevent a complete seal between the seat 156 and the diaphragm 170. The cutouts 171 are spaced radially outwardly from the exhaust seat 172 to allow the diaphragm to completely seal the exhaust passage 138,140.

Figure 15:
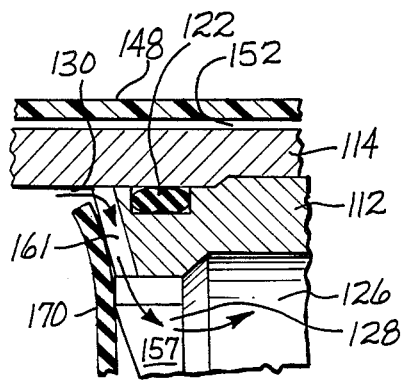
FIG. 15 is a sectional view taken along the line 15—15 in FIG. 10.

The operation of the valve 110 shown in FIGS. 8-17 is substantially the same as the operation of the valve 10 shown in FIGS. 1-7. The rest position of the valve 110 is shown in FIG. 12. When the vehicle operator applies the brakes, the diaphragm 170 deflects into its supply position shown in FIG. 13 to seal against the exhaust seat 172. Compressed air flows freely through the valve flow passage around the diaphragm 170 and to the trailer brakes. When the brake pedal is released and the tractor side of the brake line 2 is exhausted through the valve under the cab, the drop in pressure at the inlet port 142 relative to the delivery port 144 causes the diaphragm 170 to move into its exhaust position shown in FIG. 14. The diaphragm 170 moves away from the exhaust seat 172 to allow free flow from the trailer end of the line out through the exhaust passage 138,140. Some of the exhausting air flows around the diaphragm 170 through the shunt passageway and out of the valve through the inlet port 142, as shown in FIG. 15. The manner in which the diaphragm cutouts 171 and the groove 161 cooperate to insure complete dissipation of any positive pressure on the delivery side of the diaphragm 170 is described above.

A third embodiment of the valve 210 is shown in FIGS. 18-22. In this embodiment, the valve housing is made up of four pieces. The inlet end portion 212 of the housing forms the inlet port 242 and has threads 218 for connecting it to the brake line. The delivery end of the housing includes a main portion 214 and an outer portion 215 that forms the delivery port 244 and has threads 220. An insert 216 similar to the insert 16 of the embodiment of FIGS. 1-7 forms the frustoconical main valve seat 256. Two O-rings 222 seal the connections between the main delivery portion 214, and the inlet end portion 212 and the outer delivery portion 215, respectively. Each end of the housing portion 214 is crimped at 224 to retain the O-rings 222 and seal the housing portion connections.

Like the other embodiments, the valve 210 has a direct flow passage extending therethrough. The flow passage includes a substantially cylindrical portion 226 through the housing portion 212, a cross-shaped axial opening 228 through the insert 216, a short wide portion 230 adjacent to the valve seat 256, an annular passage 235 past the exhaust passage 238,240, and an outer portion 236 through the housing portion 215. The exhaust passage 238,240 has an axial portion 238 which is surrounded by and coaxial with the annular passage 235. A radial portion 240 of the exhaust passage 238,240 extends radially through the annular passage 235 to an exhaust port 246. The wall of the radial passage 240 also extends to the opposite inner circumferential wall of the housing portion 214 to provide additional support for the exhaust passage 238,240. Six circumferentially spaced radial fins 223 extend radially inwardly from the circumferential wall of the housing portion 214 into the passage 235. The fins 223 position the diaphragm 270 radially and prevent its periphery from moving too far axially into the annular passage 235.

The exhaust port 246 is provided with a rectangular dirt cover 251 to protect the valve 210 from contamination. The cover 251 is received into a recess formed by a lug 253 on the outer circumferential surface of the housing portion 214. The cover 251 is secured to the outer circumferential surface of the housing portion 214 by a fastener 254. This arrangement is an alternative to the dirt sleeve 48,148 of the other embodiments. The cover 251 deflects under the pressure of exhaust air to allow the air to exit the valve 210. The dirt sleeve approach to protecting the valve from contamination, as shown in FIGS. 1-17, is preferred over the flutter-type cover 251 shown in FIGS. 18 and 20 because it provides free unobstructed exhaust flow out of the valve. The requirement that the dirt cover 251 deflect to allow exhaust air to exit the valve 210 can affect the operational characteristics of the valve 210.

The valve 210 has a diaphragm 270 positioned between the main valve seat 256 and the exhaust seat 272 formed by the end of the axial exhaust passage portion 238. The shunt passageway of this embodiment is provided solely by arcuate cutouts 271 formed on the outer periphery of the diaphragm 270, as shown in FIG. 19.

The valve 210 shown in FIGS. 18-22 has the additional feature of a slidable push member 274,276 best seen in FIGS. 18, 21, and 22. The push member 274,276 has a shaft portion 274. The radial end surface of the shaft 274 is positioned in the axial exhaust passage portion 238 adjacent to the exhaust seat 272. Guide ribs 278 are formed on the shaft 274 to guide its sliding movement in the exhaust passage portion 238. The shaft 274 extends toward the delivery port 244 through the radial end wall of the exhaust passage 238,240 facing the delivery port 244. The end of the shaft 274 projecting from the end wall is provided with a head 276. The positioning of the head 276 outside the exhaust passage 238,240 exposes it to pressure in the flow passage portion 236.

The shaft 274 terminates at its end opposite the exhaust seat 272 in a pointed conical portion 280. An annular circumferential groove 282 is formed inwardly of the conical portion 280. The head 276 is formed separately from the shaft 274 and is made from a flexible rubber or elastomeric material. The head 276 has a socket 284 formed therein for receiving the pointed conical end 280 of the shaft 274. Portions of the head 276 extend into the groove 282 to retain the head 276 on the shaft 274. The head 276 has a frustoconical flange 286 that sealingly abuts the outer wall surface of the exhaust passage 238,240 through which the shaft 274 extends. In the rest position of the push member 274,276, the abutment of the flange 286 positions the end of the shaft 274 adjacent to the exhaust seat 272 slightly spaced from the diaphragm 270. The flange 286 has sufficient flexibility to deflect under positive pressure in the passage 236 and thereby allow the push member 274,276 to slide against the diaphragm 270 to help unseat the diaphragm 270 from the exhaust seat 272.

The operation of the valve shown in FIGS. 18-22 is substantially the same as the operation of the other illustrated embodiments. However, in the embodiment of FIGS. 18-22, the operation of the push member 274,276 described above cooperates with the bypass flow through the shunt passageway in preventing residual positive pressure on the delivery end of the valve 210. A relatively high residual positive pressure when the diaphragm 270 is seated against the exhaust seat 272 activates the push member 274,276 to unseat the diaphragm 270 from the exhaust seat 272. If the residual positive pressure is insufficient to activate the push member 274,276, bypass flow around the diaphragm 270 through the diaphragm cutouts 271 dissipates the residual positive pressure.

In valves made according to the invention, the axial opening through the valve element provided by the cutouts in the diaphragm may be formed in various ways. The diaphragm cutouts 271 shown in FIG. 19 provide an intermediate amount of bypass flow. FIG. 23 shows a modified form of a diaphragm 270' which has arcuate cutouts 271' similar to but larger than the cutouts 271 shown in FIG. 19. This provides a relatively large degree of bypass flow. The diaphragm 170 shown in FIGS. 17 and 24 has flat cutouts 171 to provide the most restrictive bypass flow of the three illustrated diaphragm embodiments. The exact form of the diaphragm cutouts may be tailored to meet the needs of a particular application. Such needs are affected by the requirements of the brake system in which the valve is installed, the presence or absence of other shunt passageway portions, and other factors.

It will be obvious to those skilled in the art to which this invention is addressed that the invention may be used to advantage in a variety of situations. Therefore, is it also to be understood by those skilled in the art that various modifications and omissions in form and detail may be made without departing from the spirit and scope of the invention as defined by the following claims.

What is claimed is:

1. A vent valve for an air brake line having a supply end and a delivery end, said valve comprising:
    a valve housing having means for attaching the housing to the line intermediate said ends; said housing defining a flow passage extending therethrough, an exhaust passage communicating the flow passage with the exterior of the housing, an inlet port positioned to communicate the flow passage with the supply end of the line, and a delivery port positioned to communicate the flow passage with the delivery end of the line;
    a valve element having a supply position in which it closes the exhaust passage and allows flow through the flow passage from the supply end of the line to the delivery end of the line when there is higher pressure at the inlet port than at the delivery port, and an exhaust position in which it substantially closes the flow passage and allows flow from the delivery end of the line through the delivery port and out of the housing through the exhaust passage when there is higher pressure at the delivery port than at the inlet port; said valve element being adapted to respond substantially instantaneously to greater pressure at the inlet port than the delivery port by moving into its supply position; and a shunt passageway communicating two portions of the flow passage on opposite sides of the valve element to prevent maintenance of a higher pressure at the delivery port than the inlet port due to movement of the valve element away from its exhaust position before pressures at the delivery port and the inlet port are equalized;

in which the exhaust passage has an inner end surrounded by a valve seat that is substantially coaxial with the flow passage, and an outer end spaced radially from the flow passage; and the flow passage extends around and past said valve seat and is coaxial with the inlet port and the delivery port.

2. The valve of claim 1, in which the valve element comprises a diaphragm that has opposite faces and that deflects when its opposite faces are exposed to different pressures, said diaphragm having sufficient flexibility to substantially instantaneously deflect to allow flow through the flow passage when the pressure at the inlet port rises above the pressure at the delivery port.

3. The valve of claim 2, in which the diaphragm seals against said valve seat in said supply position; and which further comprises a slidable push member having a first end positioned in the exhaust passage adjacent to said seat, and a second end exposed to pressure in the flow passage at a location between the diaphragm and the delivery port to move said first end against the diaphragm to help unseat the diaphragm in response to pressure at said location higher than pressure at the inlet port.

4. The valve of claim 3, in which said second end comprises a head with a flexible frustoconical flange that seals against an outer wall of the exhaust passage and deflects to allow said first end to move against the diaphragm.

5. The valve of claim 4, which comprises a valve seat surrounding the flow passage between the inlet port and the delivery port; and in which the valve element engages said seat to substantially close the flow passage in said exhaust position, and the shunt passageway comprises an axial passage that is formed by the housing and that extends around the periphery of said seat.

6. A vent valve for an air brake line having a supply end and a delivery end, said valve comprising:
a valve housing having means for attaching the housing to the line intermediate said ends; said housing defining a flow passage extending therethrough, an exhaust passage communicating the flow passage with the exterior of the housing, an inlet port positioned to communicate the flow passage with the supply end of the line, and a delivery port positioned to communicate the flow passage with the delivery end of the line;
a valve element having a supply position in which it closes the exhaust passage and allows flow through the flow passage from the supply end of the line to the delivery end of the line when there is higher pressure at the inlet port than at the delivery port, and an exhaust position in which it substantially closes the flow passage and allows flow from the delivery end of the line through the delivery port and out of the housing through the exhaust passage when there is higher pressure at the delivery port than at the inlet port; said valve element being adapted to respond substantially instantaneously to greater pressure at the inlet port than the delivery port by moving into its supply position; and
a shunt passageway communicating two portions of the flow passage on opposite sides of the valve element to prevent maintenance of a higher pressure at the delivery port than the inlet port due to movement of the valve element away from its exhaust position before pressures at the delivery port and the inlet port are equalized;
wherein the valve comprises a valve seat surrounding the flow passage between the inlet port and the delivery port, the valve element engages said seat to substantially close the flow passage in said exhaust position, and the shunt passageway comprises a peripheral axial opening through the valve element adjacent to said seat to prevent a complete seal between said seat and the valve element.

7. The valve of claim 6, in which the shunt passageway further comprises a bypass passage that is formed by the housing and that extends through said seat.

8. A vent valve for an air brake line having a supply end and a delivery end, said valve comprising:
a valve housing having means for attaching the housing to the line intermediate said ends; said housing defining a flow passage extending therethrough, an exhaust passage communicating the flow passage with the exterior of the housing, an inlet port positioned to communicate the flow passage with the supply end of the line, and a delivery port positioned to communicate the flow passage with the delivery end of the line;
a valve element having a supply position in which it closes the exhaust passage and allows flow through the flow passage from the supply end of the line to the delivery end of the line when there is higher pressure at the inlet port than at the delivery port, and an exhaust position in which it substantially closes the flow passage and allows flow from the delivery end of the line through the delivery port and out of the housing through the exhaust passage when there is higher pressure at the delivery port than at the inlet port; said valve element being adapted to respond substantially instantaneously to greater pressure at the inlet port than the delivery port by moving into its supply position; and
a shunt passageway communicating two portions of the flow passage on opposite sides of the valve element to prevent maintenance of a higher pressure at the delivery port than the inlet port due to movement of the valve element away from its exhaust position before pressures at the delivery port and the inlet port are equalized;
wherein the valve comprises a valve seat surrounding the flow passage between the inlet port and the delivery port, the valve element engages said seat to substantially close the flow passage in said exhaust position, and the shunt passageway comprises a bypass passage that is formed by the housing and that extends through said seat to prevent a complete seal between said seat and the valve element.

9. A vent valve for an air brake line having a supply end and a delivery end, said valve comprising:
a valve housing having means for attaching the housing to the line intermediate said ends; said housing defining a flow passage extending therethrough, an exhaust passage communicating the flow passage with the exterior of the housing, an inlet port positioned to communicate the flow passage with the supply end of the line, and a delivery port positioned to communicate the flow passage with the delivery end of the line;

a valve element having a supply position in which it closes the exhaust passage and allows flow through the flow passage from the supply end of the line to the delivery end of the line when there is higher pressure at the inlet port than at the delivery port, and an exhaust position in which it substantially closes the flow passage and allows flow from the delivery end of the line through the delivery port and out of the housing through the exhaust passage when there is higher pressure at the delivery port than at the inlet port; said valve element being adapted to respond substantially instantaneously to greater pressure at the inlet port than the delivery port by moving into its supply position; and a shunt passageway communicating two portions of the flow passage on opposite sides of the valve element to prevent maintenance of a higher pressure at the delivery port than the inlet port due to movement of the valve element away from its exhaust position before pressures at the delivery port and the inlet port are equalized;

wherein the valve element comprises a diaphragm that has opposite faces and that deflects when its opposite faces are exposed to different pressures, said diaphragm having sufficient flexibility to substantially instantaneously deflect to allow flow through the flow passage when the pressure at the inlet port rises above the pressure at the delivery port; and wherein the valve comprises a valve seat surrounding the flow passage between the inlet port and the delivery port, the diaphragm engages said seat to substantially close the flow passage in said exhaust position, and the shunt passageway comprises a peripheral axial opening through the diaphragm adjacent to said seat to prevent a complete seal between said seat and the diaphragm.

10. The valve of claim 9, in which the shunt passageway further comprises a bypass passage that is formed by the housing and that extends through said seat.

11. The valve of claim 10, in which said seat comprises a frustoconical surface having a center axial opening that forms part of the flow passage, and said bypass passage extends along said frustoconical surface from said center axial opening to and through the outer periphery of said seat.

12. The valve of claim 9, in which the exhaust passage has an inner end surrounded by a second valve seat that is substantially coaxial with the flow passage, and an outer end spaced radially from the flow passage; the flow passage extends around and past said second seat and is coaxial with the inlet port and the delivery port; the diaphragm seals against said second seat in said supply position; and said axial opening is spaced radially outwardly from said second seat.

13. The valve of claim 12, in which the shunt passageway further comprises a bypass passage that is formed by the housing and that extends through said seat surrounding the flow passage.

14. A vent valve for an air brake line having a supply end and a delivery end, said valve comprising:

a valve housing having means for attaching the housing to the line intermediate said ends; said housing defining a flow passage extending therethrough, an exhaust passage communicating the flow passage with the exterior of the housing, an inlet port positioned to communicate the flow passage with the supply end of the line, and a delivery port positioned to communicate the flow passage with the delivery end of the line;

a valve element having a supply position in which it closes the exhaust passage and allows flow through the flow passage from the supply end of the line to the delivery end of the line when there is higher pressure at the inlet port than at the delivery port, and an exhaust position in which it substantially closes the flow passage and allows flow from the delivery end of the line through the delivery port and out of the housing through the exhaust passage when there is higher pressure at the delivery port than at the inlet port; said valve element being adapted to respond substantially instantaneously to greater pressure at the inlet port than the delivery port by moving into its supply position; and a shunt passageway communicating two portions of the flow passage on opposite sides of the valve element to prevent maintenance of a higher pressure at the delivery port than the inlet port due to movement of the valve element away from its exhaust position before pressures at the delivery port and the inlet port are equalized;

wherein the valve element comprises a diaphragm that has opposite faces and that deflects when its opposite faces are exposed to different pressures, said diaphragm having sufficient flexibility to substantially instantaneously deflect to allow flow through the flow passage when the pressure at the inlet port rises above the pressure at the delivery port; and wherein the valve comprises a valve seat surrounding the flow passage between the inlet port and the delivery port, the diaphragm engages said seat to substantially close the flow passage in said exhaust position, and the shunt passageway comprises a bypass passage that is formed by the housing and that extends through said seat to prevent a complete seal between said seat and the diaphragm.

15. The valve of claim 14, in which said seat comprises a frustoconical surface having a center axial opening that forms part of the flow passage, and said bypass passage extends along said frustoconical surface from said center axial opening to and through the outer periphery of said seat.

* * * * *